United States Patent [19]

LeRoy et al.

[11] 4,225,402
[45] Sep. 30, 1980

[54] METHOD FOR HEAVY-WATER EXTRACTION FROM NON-ELECTROLYTIC HYDROGEN STREAMS USING A COMBINED ELECTROLYSIS AND CATALYTIC EXCHANGE SYSTEM

[75] Inventors: Rodney L. LeRoy, Pointe Claire; Martin Hammerli; John P. Butler, both of Deep River, all of Canada

[73] Assignees: Noranda Mines Limited; The Electrolyser Corporation Ltd., both of Toronto, Canada

[21] Appl. No.: 21,306

[22] Filed: Mar. 16, 1979

[30] Foreign Application Priority Data

Mar. 30, 1978 [CA] Canada .................................. 300034

[51] Int. Cl.$^2$ .............................................. C25B 1/04
[52] U.S. Cl. ................................................. 204/129
[58] Field of Search ........................................ 204/129

[56] References Cited
U.S. PATENT DOCUMENTS 3,974,048  8/1976  Hammerli et al. .................... 204/101
3,981,976  9/1976  Stevens ................................ 423/580

OTHER PUBLICATIONS

"Peak Power & Heavy Water Production from Electrolytic H$_2$ & O$_2$ Using Candu Reactors", by M. Hammerli et al., Mar. 3, 1976.
Nuclear Chem. Engineering, M. Benedict et al., McGraw Hill Co., 1957.

Primary Examiner—R. L. Andrews

[57] ABSTRACT

A method is disclosed for heavy-water extraction from non-electrolytic hydrogen streams using a modified Combined Electrolysis and Catalytic Exchange-Heavy Water Process (CECE-HWP). The method comprises contacting feed water in a catalyst column with hydrogen gas originating partly from such non-electrolytic hydrogen stream and partly from an electrolytic hydrogen stream so as to enrich the feed water with deuterium extracted from both the non-electrolytic and electrolytic hydrogen gas, and passing the deuterium enriched water to an electrolyzer wherein the electrolytic hydrogen gas is generated and then fed through the catalyst column.

7 Claims, 8 Drawing Figures

METHOD FOR HEAVY-WATER EXTRACTION FROM NON-ELECTROLYTIC HYDROGEN STREAMS USING A COMBINED ELECTROLYSIS AND CATALYTIC EXCHANGE SYSTEM

This invention relates to heavy water extraction from non-electrolytic hydrogen streams using a combined electrolysis and catalytic exchange process.

Heavy water is a valuable by-product of the electrolysis of water to produce hydrogen and oxygen, such as is done in many industrial applications where hydrogen is used for example as a feedstock for the manufacture of ammonia or other chemicals. World demand for heavy-water is estimated at between 3,000 and 4,000 metric tons per year by the early 1980's, rising to 8,000 tons by 1990. The primary use of heavy-water to date is as a moderator and coolant in the CANDU nuclear reactors.

It is well known that in the electroysis of water to produce hydrogen and oxygen, the ratio of deuterium to hydrogen in the gas evolved at the cathode is lower than that in the electrolyte and that, in consequence, the deuterium content in the electrolyte increases until it reaches a value several times that in the feed water. Therefore, heavy water can be produced by carrying out electrolysis of water in a series of stages. Although the efficiency of deuterium recovery can be greater than 70%, the process requires a large number of stages (about 17) and as a result the system is very complex. Further the entire water feed to the plant has to be electrolysed about twice so that the electrical power costs of this process are very high. A greatly improved energy efficiency has been achieved by combining the above electrolysis process with a catalytic exchange process using a catalyst column such as the one developed by Atomic Energy of Canada and disclosed in U.S. Pat. Nos. 3,974,048, issued Aug. 10, 1976 and 3,981,976, issued Sept. 21, 1976 and in the U.S. Pat. Application Ser. Nos. 733,417, filed Oct. 18, 1976 and 733,422, filed Oct. 18, 1976. With this Combined Electrolysis and Catalytic Exchange-Heavy Water Process (henceforth referred to as CECE-HWP) the electrical energy requirements are reduced by a factor of about two, i.e. the feed water needs only to be electrolysed once, and with this process recoveries as high as 75% of the deuterium in the feed water are possible in practice.

Electrolytic hydrogen, however, is not presently produced on a sufficiently massive scale for these approaches to be a major source of heavy water in comparison with projected world demand, even taking account of the large expansion of electrolytic hydrogen usage expected by 1990. Only about 1.5 to 2.5 grams of $D_2O$ are produced with each 1000 SCF of hydrogen.

Thus, other processes are necessary to meet projected heavy-water demand, with the hydrogen sulfide-based Girdler-Sulfide process being presently favoured.

On the other hand, hydrogen from non-electrolytic sources is currently generated world wide on a massive scale, primarily in the production of ammonia and methanol, and in petroleum refining. 1973 usage in the United States was approximately 3 trillion SCF, with an additional 6 trillion SCF being used in the rest of the world. These hydrogen streams contain deuterium, typically in an atomic proportion of 120 ppm. If 40% of this deuterium could be recovered as heavy-water, the corresponding production would be 4,900 metric tons per year in the U.S.A. and 9,000 tons per year in the rest of the world. Corresponding capacity in Canada would be 200 metric tons per year from hydrogen streams used in the production of ammonia, and 50 tons per year from hydrogen streams used in the processing of synthetic crude oil.

Applicants have now discovered that heavy water can be extracted from non-electrolytic hydrogen streams using an important modification of the CECE-HWP.

The method, in accordance with the invention, comprises contacting feed water in a catalyst column with hydrogen gas originating partly from such non-electrolytic hydrogen stream and partly from an electrolytic hydrogen stream, so as to enrich the feed water with the deuterium extracted from both the non-electrolytic and electrolytic hydrogen gas, and passing the deuterium water to an electrolyser wherein the electrolytic hydrogen gas is generated and then fed through the catalyst column.

The ratio of non-electrolytic hydrogen gas to electrolytic hydrogen may be as high as $\alpha$-1 where $\alpha$ is the equilibrium deuterium to hydrogen ratio between liquid water and hydrogen gas in the catalyst column. In principle, it is possible to obtain about a 5% larger ratio than $\alpha$-1, in an operating system. Using a nonelectrolytic hydrogen stream, about 3 times as much heavy water can be produced for the same amount of electrical power as would be used in the CECE-HWP.

Feed water is normally fed to the top of the catalyst column and the deuterium enriched water leaving the bottom of the catalyst column is fed to the electrolyser. The electrolytic hydrogen gas originating from the electrolyser is mixed with the non-electrolytic hydrogen gas and fed to the bottom of the catalyst column.

A preferred embodiment of the invention includes two catalyst columns, a stripper and an enricher, connected in series. The feed water is fed to the top of the stripper and the deuterium enriched water leaving the bottom of the stripper is fed to the top of the enricher. The deuterium enriched feed water from the enricher is fed to the electrolyser. The electrolytic hydrogen gas originating from the electrolyser is fed to the bottom of the enricher and the hydrogen gas leaving the top of the enricher is mixed with the non-electrolytic hydrogen gas and fed to the bottom of the stripper.

The hydrogen gas leaving the top of the catalyst column or the stripper (preferred embodiment), depleted in deuterium, is the waste stream with respect to this process, but it is a valuable product for processes requiring hydrogen.

Heavy water extraction is preferably done in a series of stages, about 3, with the non-electrolytic hydrogen stream being fed to the first stage only. For the second and successive stages, the feed water for the stage is withdrawn from the electrolyser of the previous stage in the series, whereas the hydrogen gas generated in each stage, after passing through the catalyst column of the stage, is returned to the previous stage where it is mixed with the electrolytic hydrogen gas and the resulting gas mixture is fed to the bottom of the catalyst column of such previous stage. In the preferred embodiment of the process, the two catalyst columns are used in the first stage only since non-electrolytic hydrogen is fed to that stage only. The second and successive stages use only one catalyst column and the hydrogen gas generated in the second stage, after passing through the catalyst column of that stage, is returned to the first stage where it is mixed with the electrolytic hydrogen gas and the resulting gas mixture fed to the bottom of the enricher of the first stage, whereas the hydrogen gas generated in the third and successive stages, after passing through the catalyst column of that stage, is returned to the previous stage where it is mixed with the resulting gas mixture and fed to the catalyst column of such previous stage.

The invention will now be disclosed, by way of example, with reference to the accompanying drawings in which.

1. Electrolytic Process

Figure 1:
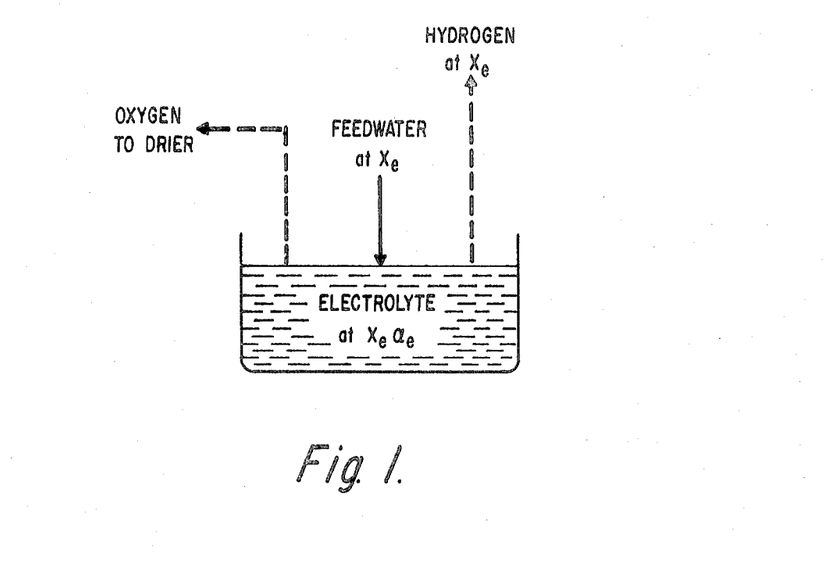
FIG. 1 is a schematic representation of a water electrolyser picturing the steady state deuterium concentrations.

Heavy water production in a water electrolyser is based on the kinetic isotope effect. In the cathodic evolution of hydrogen from water, the atom fraction of deuterium in the hydrogen produced is between about 3 and 10 times lower than it is in the reagent water. This reflects the relative zero-point energy level depressions due to deuterium substitution for atomic hydrogen in these two molecular forms. The steady-state result for a single electrolyser is pictured in FIG. 1. The feed water contains deuterium at a D/(H+D) atom of $X_e$, and the electrolyte is initially at the same level.

For either a kinetic process or an equilibrium process, the deuterium to protium isotope separation factor, $\alpha$, is rigorously defined as the deuterium to protium atom ratio in the liquid phase, divided by the deuterium to protium atom ratio in the gas phase. Expressed symbolically, this separation factor, $\alpha$, is written as:

$$\alpha = \frac{(D/H) \text{ liquid}}{(D/H) \text{ gas}} = \frac{X(1-y)}{y(1-X)} \quad (1)$$

where $X$ = atom fraction of deuterium in the liquid phase (water) with respect to total hydrogen (mass 1 and 2) in that phase, and $y$ = atom fraction of deuterium in the gas phase (hydrogen gas) with respect to total hydrogen (mass 1 and 2) in that phase. Equation (1) can be usefully transformed to give a result for either the atom fraction of deuterium in the liquid phase $X$ or in the gas phase $y$. The results are:

$$y = \frac{X}{\alpha - X(\alpha - 1)}, \text{ and} \quad (2)$$

$$X = \frac{\alpha y}{1 + y(\alpha - 1)}. \quad (3)$$

When the atom fractions $X$ and $y$ are very small, equations (2) and (3) reduce to the simple result:

$$\alpha = X/y. \quad (4)$$

As the atom fractions of deuterium increase, $y$ becomes greater, and $X$ less, than the result predicted by the approximate equation (4).

Based on the approximate result of equation (4), the hydrogen product of a single stage electrolyser fed with natural water has an initial deuterium concentration of $X_e/\alpha_e$, where $\alpha_e$ is the electrolytic kinetic isotope separation factor. This is approximately 6 for iron cathodes at 70° C. As electrolysis proceeds and with no product withdrawal the concentration of heavy water in the electrolyte will increase until the hydrogen product contains the same deuterium to protium ratio as the feed water. At this steady state condition, the electrolyte will contain deuterium at a concentration of $X_e\alpha_e$. For a feed water deuterium concentration of $X_e = 140 \times 10^{-6} = 140$ ppm, the steady state deuterium concentration of the electrolyte would be equal to approximately 840 ppm.

Further concentration of heavy water is achieved by using electrolyte from this first stage electrolyser as the feed water for a second stage. In this case, the steady state concentration of the first stage electrolyte would be less than $X_e\alpha_e$ with a corresponding reduction in the deuterium content of the product hydrogen. Although the efficiency of deuterium recovery can be greater than 70%, the process requires a large number of stages (about 17) to produce heavy water of greater than 99% purity and as a result the system is very complex and costly. Furthermore, the entire water feed to the plant has to be electrolysed about twice so that the electrical power costs of this process are very high.

2. Combined Electrolysis and Catalytic Exchange-Heavy Water Process (CECE-HWP)

This process was described by Hammerli, Stevens, Bradley and Butler in a paper presented at the First World Hydrogen Energy Conference, Miami, Mar. 1-3, 1976. A similar but more cumbersome process was utilized in a heavy water recovery plant built at a synthetic ammonia plant of the Consolidated Mining and Smelting Co., located at Trail, British Columbia, Canada. A description of the Trail process is given on page 445 of "Nuclear Chemical Engineering", by Benedict and Pigford, published by McGraw Hill Book Company. Basically, hydrogen gas, produced in electrolysis cells, which is already depleted in deuterium relative to the electrolyte as discussed in section 1, is further stripped of deuterium by being passed preferably counter current to feed water through a column in which catalytic exchange of hydrogen isotopes occurs between gaseous hydrogen and liquid water according to the overall chemical exchange reaction:

$$HD \text{ gas} + H_2O \text{ liquid} \xrightleftharpoons{\text{catalyst}} H_2 \text{ gas} + HDO \text{ liquid}. \quad (5)$$

This column contains catalysts such as those disclosed in the above mentioned U.S. Pat. Nos. 3,974,048 and 3,981,976, and U.S. Patent Application Ser. Nos. 733,417 and 733,422. These catalysts promote efficient transfer of deuterium between the two phases in the presence of liquid water.

Starting with a natural water feed containing approximately 150 ppm deuterium, several stages of the CECE-HWP are required in a cascade arrangement to produce a heavy water product containing approximately 99.8 atom percent deuterium. In the cascade, hydrogen depleted in deuterium leaving the top of the catalyst column is burned with oxygen and returned to the electrolyser cells of the previous stage as disclosed in the above Miami paper, or simply returned to the previous stage when it is mixed with the hydrogen from the electrolysis cells and fed to the catalyst column of said previous stage, as it was done in the above mentioned Trail process. However in the first stage, the hydrogen depleted in deuterium from the top of the catalyst column is the product hydrogen stream. A small fraction of the deuterium enriched water from the electrolysis cells serves as liquid water feed to the top of the catalyst column of the next stage. In the last stage this stream is the heavy water product stream, $L_p$. The water which is withdrawn from the electrolyte of one stage and passed on to the catalyst column of the next stage would have to be completely stripped of caustic, so as not to lower the performance of the catalyst nor to upset the caustic balance in the electrolyser plant. One method of doing this would be to remove an appropriate amount of water vapour from the product oxygen gas from the cells and to return any caustic to the cells. The removal of water vapour from the oxygen gas is essential in any case to prevent the loss of deuterium from the cell electrolyte. Many alternate and equally effective arrangements can be envisaged to obtain a water feed for the next stage from the electrolyte.

The CECE-HWP only requires three stages to produce reactor grade heavy water, approximately 99.8%, from a natural water feed in one arrangement described by Hammerli et al in their paper presented at the First World Hydrogen Energy Conference, Miami, Mar. 1-3, 1976.

3. Heavy Water Production from Non-Electrolytic Hydrogen

Applicants have now realized that heavy water can be recovered from a non-electrolytic hydrogen stream using an important modification of the CECE-HWP described above.

This modification consists of mixing non-electrolytic hydrogen with the electrolytic hydrogen originating from the first stage of the CECE-HWP system and then feeding such mixture to the bottom of the catalyst column. Natural water is fed to the top of the catalyst column and flows counter-current to the hydrogen gas. Thus, deuterium from both the non-electrolytic and electrolytic hydrogen is transferred in the catalyst column to the natural water feed by means of the overall catalysed exchange reaction given in equation (5).

With the modified CECE-HWP system the deuterium concentration in all the hydrogen gas leaving the top of the column will approach the value in equilibrium with the natural water feed. For an operating catalyst column the deuterium concentration in the hydrogen gas at the top of the column, $y_t$, only approaches the equilibrium value. As will be recognized by persons skilled in the art it will normally be only economically practical to operate the column so that the (D/H) ratio of the hydrogen gas is "pinched" to be 5-10% higher than the equilibrium value, that is:

$$(D/H)_{H_2} = \frac{(D/H)_{H_2O(liquid)}}{Z\alpha} \quad (6)$$

where Z is the pinching factor which is slightly less than unity i.e. 0.95 to 0.90. When the deuterium concentrations are given as atom fractions equation (2) becomes:

$$y_t = \frac{X_t}{Z\alpha - X_t(Z\alpha - 1)} \quad (7)$$

where $X_t$ is the deuterium atom fraction in the water feed at the top of the deuterium exchange column. For very small deuterium concentrations equation (7) can be simplified to:

$$Y_t = X_t/Z\alpha. \quad (8)$$

If it is assumed that a reasonable value of $Z\alpha$ is 3.5 and that the deuterium concentration in the natural water feed is 150 ppm then the deuterium concentration in the hydrogen at the top of the catalyst column is approximately 43 ppm. Assuming the deuterium concentration in the non-electrolytic hydrogen is 120 ppm, the difference of, in this case, 77 ppm is stripped from the non-electrolytic hydrogen stream and enriches the water which eventually flows to the electrolyser.

It is therefore proposed in accordance with the invention, to use a modified combined electrolysis and catalytic exchange process for the production of heavy water, parasitic production, from non-electrolytic hydrogen streams. The use of this modified CECE-HWP implies that there are two feed stocks to the plant, natural water and non-electrolytic hydrogen. In the process essentially all the liquid water feed is electrolysed to give hydrogen and it is necessary to establish a criterion for the relative flow of non-electrolytic hydrogen to electrolytic hydrogen in the catalyst column.

The assumption used as a basis for the calculations below is that non-electrolytic hydrogen is the economically preferred form. This means that the desired amount of electrolysis is the minimum amount which will allow all the deuterium in the non-electrolytic hydrogen to be stripped to a level $X_t/Z\alpha$. The problem, therefore, is to compute the maximum quantity of non-electrolytic hydrogen which can be mixed with the hydrogen stream from the first stage electrolyser, as it enters the catalyst column.

Figure 2:
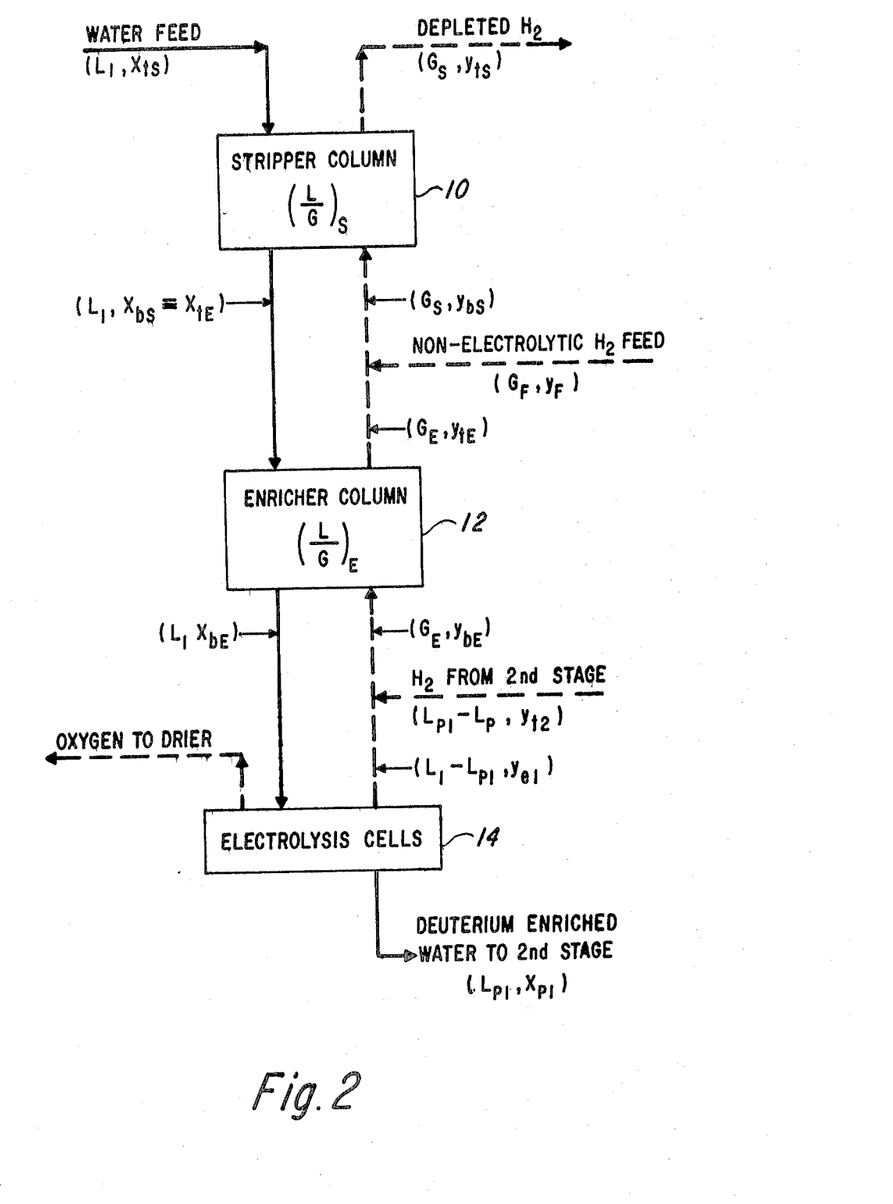
FIG. 2 is a schematic representation of the first stage of a preferred system for stripping deuterium from a non-electrolytic hydrogen stream, using the combined electrolysis and catalytic exchange process.

The non-electrolytic hydrogen stream is added at the first stage and can be mixed directly with the hydrogen gas from the electrolysis cells; or it can be added to a separate stripper column as it will be disclosed later. These arrangements are examined in the following sections:

3.1 Non-Electrolytic Hydrogen Admixture to Electrolytic Hydrogen at the Bottom of a Stripper Column The preferred arrangement for the modified CECE-HWP which uses a source of non-electrolytic hydrogen as a partial feed to the first stage of the plant is pictured schematically in FIG. 2. $L_1$ moles of feed water with a deuterium atom fraction of $X_{tS}$ enter the system at the top of a stripper column 10 and passes counter-current to a stream of hydrogen gas. The hydrogen gas which enters at the bottom of the stripper consists of a mixture of $G_F$ moles of non-electrolytic hydrogen with a deuterium concentration, $y_F$, and $G_E$ moles of electrolytic hydrogen from the top of an enricher 12 at a deuterium concentration of $y_{tE}$. The total hydrogen flow in the stripper column, $G_S$ where $G_S = G_E + G_F$, is depleted in deuterium and leaves the top of the stripper at a deuterium concentration of $y_{tS}$. The $L_1$ moles of water flowing through the stripper are enriched in deuterium and the resulting water stream enters the first stage enricher column of the CECE-HWP system at a deuterium concentration of $X_{tE}$.

In the enricher column the deuterium concentration of the liquid water stream is further increased by passing the water counter-current to a deuterium enriched electrolytic hydrogen from electrolysis cells 14. To complete the first stage of the system, a small liquid product stream, $L_{p1}$, enriched in deuterium to a concentration of $X_{p1}$, is withdrawn from the electrolysis cells and is passed to the 2nd stage of a normal CECE-HWP. Also, a reflux stream of hydrogen from the second stage catalyst column is returned to the first stage. This hydrogen is depleted in deuterium relative to the first stage liquid product, having a concentration $y_{t2}$. The molar flow of this hydrogen is $(L_{p1} - L_p)$ where $L_p$ is the liquid product flow of heavy water for the entire system and usually has a concentration of approximately 99.8% $D_2O$. This reflux hydrogen stream is mixed with the electrolytic hydrogen from the first stage electrolysis cells to give a total molar flow, $G_E$, at a deuterium concentration $y_{bE}$, and the combined hydrogen gas enters the bottom of the enricher column of FIG. 2.

The maximum amount of non-electrolytic hydrogen relative to the electrolytic hydrogen that can be added to this modified CECE-HWP can be derived by a relatively simple argument. In the derivation that follows, it will be assumed that only liquid water and hydrogen gas flow in the catalyst columns; that is, the flow of water vapour contained in the gas stream is neglected. This is a good approximation for a column operating near ambient temperature and at moderate pressures where the ratio of the vapour pressure of water to the hydrogen partial pressure, $p_{H_2O}/p_{H_2}$, is small, say less than 0.03. For this ratio the error introduced into the deuterium material balance equations is considerably less than 3% if the system is designed to bring the water vapour in the gas stream leaving the top of the catalyst column into near equilibrium with the liquid water entering the column, or if the water vapour in the gas stream is condensed and returned to the column.

To derive the maximum amount of non-electrolytic hydrogen which can be added to the electrolytic hydrogen, it is assumed that the fractional approach to equilibrium between the two phases at the top and bottom of the stripper and the top of the enricher is the same, that is, the value of Z at these three positions is the same. For a flow of non-electrolytic hydrogen of $G_F$ moles with a deuterium mole fraction, $y_F$, a deuterium material balance around the stripper gives:

$$L_1 X_{ts} + G_F y_F + G_E y_{tE} = G_S y_{tS} + L_1 X_{bS} \qquad (9)$$

where the X and y terms are deuterium atom fractions of the liquid water and hydrogen gas respectively as given in FIG. 2. The L and G terms refer to the molar flow of water and hydrogen respectively as also indicated in FIG. 2. Since the deuterium concentrations in the two phases are pinched to the same Z values, the following relations are good approximations for small deuterium concentrations (compare equations (7) and (8)):

$$y_{tE} = X_{tE}/Z\alpha \qquad (10)$$

$$X_{bS} = Z\alpha y_{bS}, \text{ and} \qquad (11)$$

$$y_{tS} = X_{tS}/Z\alpha. \qquad (12)$$

Since the deuterium concentration in the water at the bottom of the stripper and at the top of the enricher is the same, $X_{bS} \equiv X_{tE}$, then from equations (10) and (11) $y_{tE}$ and $y_{bS}$ must be equal to each other as well as to the $y_F$, that is:

$$y_{tE} = y_{bS} = y_F. \qquad (13)$$

Substituting these relationships into equation (9) the simple relationship:

$$(L/G)_S = L_1/G_S = 1/Z\alpha \qquad (14)$$

is obtained. From FIG. 2, $G_S = L_1 - L_p + G_F$ so that:

$$\left(\frac{L}{G}\right)_S = \frac{L_1}{L_1 - L_p + G_F} = \frac{1}{Z\alpha}, \qquad (15)$$

from which, $$G_F = L_1(Z\alpha - 1) + L_p. \qquad (16)$$

Since the final product flow, $L_p$, is very small with respect to $L_1$, the ratio of non-electrolytic to electrolytic hydrogen, $G_F/G_E$, becomes:

$$G_F/G_E \approx (Z\alpha - 1). \qquad (17)$$

Thus the maximum ratio occurs when $Z = 1$, that is:

$$(G_F/G_E)_{max} \approx (\alpha - 1). \qquad (18)$$

This remarkably simple result demonstrates that the maximum flow of non-electrolytic hydrogen which can be used is independent of both the electrolytic separation factor, $\alpha_e$, and the deuterium concentration in the first stage electrolyser, $X_{p1}$. Use of this process would require that a minimum fraction of $1/\alpha$ of the total hydrogen stream, $G_S$, be produced by electrolysis.

In practice, however, $Z < 1$, and equation (17) thus predicts that the maximum value of the ratio $G_F/G_E$ is correspondingly less than $(\alpha - 1)$. It is of course possible to operate the stripper with values of $G_F/G_E$ ranging from $(Z\alpha - 1)$ to values approaching zero depending on the relative economics between non-electrolytic and electrolytic hydrogen. At $G_F/G_E = 0$, the non-electrolytic hydrogen stream is also zero so that the sripper column in this instance reverts to the top portion of the catalyst column of the unmodified CECE-HWP.

If it is assumed that the pinching factor, Z, is only equal at the top of the stripper and the top of the enricher while it has some different, larger value at the base of the stripper, then it is possible in principle to operate the stripper at $G_F/G_E$ ratios which are larger than that predicted by equation (18) or at corresponding $(L/G)_S$ ratios smaller than $1/\alpha$: for example, assuming $Z = 0.9$, the $G_F/G_E$ ratio is about 6% higher than $(\alpha - 1)$. However, to obtain this higher value of $G_F/G_E$, the liquid water at the bottom of the stripper, $X_{bS}$, is in equilibrium with the hydrogen gas, $y_{bS}$, that is, the pinching factor here is unity.

It should be noted, however, that if Z approaches unity in any part of the system, the catalyst requirements become extremely large. Thus in practice, the maximum value of $G_F/G_E$ will probably not exceed 85% of $(\alpha-1)$. On the other hand, this modified CECE-HWP will probably not be used unless the value of $G_F/G_E$ is at least greater than unity. These probable limits of $G_F/G_E$ correspond to values of $(L/G)_S$ from $1/(0.85\alpha+(1-0.85))$ to 0.5 respectively.

The limitation of $G_F/G_E$ to 85% of $(\alpha-1)$ reflects an economic constraint due to the increasing amounts of catalyst required when the pinching factor approaches unity. For example, in the limit of equation (14) with a pinching factor approaching unity the liquid to gas ratio in the stripper column would be approximately 0.26. While such a value is possible, a very large quantity of catalyst would be required for operation in this way. As the liquid to gas ratio in a catalyst column decreases, the number of transfer units required in the catalyst column increases, and can, in fact, increase very substantially when the liquid to gas ratio approaches 0.3 or less. This results in a substantial increase in the required catalyst volume. Thus it might prove economical to operate the method in accordance with this invention with somewhat less non-electrolytic hydrogen than would be optimal in the absence of this consideration. The above statement that $G_F/G_E$ will probably be limited to 85% of $(\alpha-1)$ reflects these considerations. The admixture to be used in any particular case will be determined by balancing the value of increased heavy-water production against the cost of the increased catalyst volume required.

For an operating system, where $(L/G)_S$ may be varied independently of the pinching factor, there is a general relationship between $X_{bS}$, $y_{tE}$, $y_{tS}$ and $(L/G)_S$ for given values of $X_{tS}$ and $y_F$, that is, the two feed streams to the system, as follows:

$$X_{bS} - \frac{y_{tE}}{(L/G)_E} = \left[\frac{1}{(L/G)_S} - \frac{1}{(L/G)_E}\right] y_F + X_{tS} - \frac{y_{tS}}{(L/G)_S}. \quad (19)$$

To solve equation (19) for possible values of $(L/G)_S$, any values of $X_{bS}$, $y_{tE}$ and $y_{tS}$ may be chosen provided they do not lie outside the limits imposed by the equilibrium separation factor, $\alpha$. If, for example, it is assumed that the deuterium concentrations in the two phases are pinched to the same Z values at the top and bottom of the stripper and the top of the enricher, then $(L/G)_S$ is equal to $1/Z\alpha$ as previously given in equation (14).

However, one could equally well choose a value of $(L/G)_S$ which lies within its constraints discussed previously and choose the same Z for only the top and bottom of the stripper. Since in the first stage of this modified CECE-HWP the deuterium concentrations are small so that the simple relationships of equations (10) and (12) are valid and $(L/G)_E$ is essentially unity, then equation (19) may be rewritten as:

$$X_{bS}\left[1 - \frac{1}{Z\alpha}\right] = \quad (20)$$

$$\left[\frac{1}{(L/G)_S} - 1\right] y_F + X_{tS}\left[1 - \frac{1}{(L/G)_S Z\alpha}\right].$$

from which $X_{bS}$ can be evaluated. It will be obvious to those skilled in the art that other choices are possible to satisfy equation (19).

To complete the characterization of the stripper, $y_{bS}$ is evaluated from equation (21) which incorporates the fact that the non-electrolytic hydrogen feed may have a different deuterium concentration relative to the electrolytic hydrogen at the top of the enricher:

$$y_{bS} = \frac{G_F y_F + G_E y_{tE}}{G_S} \quad (21)$$

$$= y_F + \frac{(L/G)_S}{(L/G)_E}(y_{tE} - y_F)$$

$$= y_F + \left(\frac{L}{G}\right)_S \left(\frac{X_{bS}}{Z\alpha} - y_F\right).$$

To complete the characterization of the system shown in FIG. 2, values of $y_{bE}$, $X_{bE}$, and $L_{p1}$ can be obtained from the following equations:

$$y_{bE} = \frac{X_{p1}}{L_1 - L_p}\left[\frac{L_1 - L_{p1}}{\alpha_e} + \frac{L_{p1} - L_p}{Z\alpha}\right] \quad (22)$$

$$X_{bE} = \frac{L_1 - L_p}{L_1}\left(y_{bE} - \frac{X_{tE}}{Z\alpha}\right) + X_{tE} \text{ and} \quad (23)$$

$$L_{p1} = \frac{L_1 X_{tE} - (L_1 - L_p)y_{tE} - L_p y_{t2}}{X_{p1} - y_{t2}} \quad (24)$$

where in equation (24) $y_{tE}$ is given in equation (10) and $y_{t2}$, the deuterium concentration in the hydrogen gas leaving the top of the 2nd stage catalyst column, is:

$$y_{t2} = X_{p1}/Z\alpha. \quad (25)$$

It can be shown that equation (24) can be approximated to:

$$L_{p1} = \frac{L_1 X_{tE}}{X_{p1}}. \quad (26)$$

This equation is actually quite accurate because some of the second order correction terms essentially cancel each other.

Figure 3:
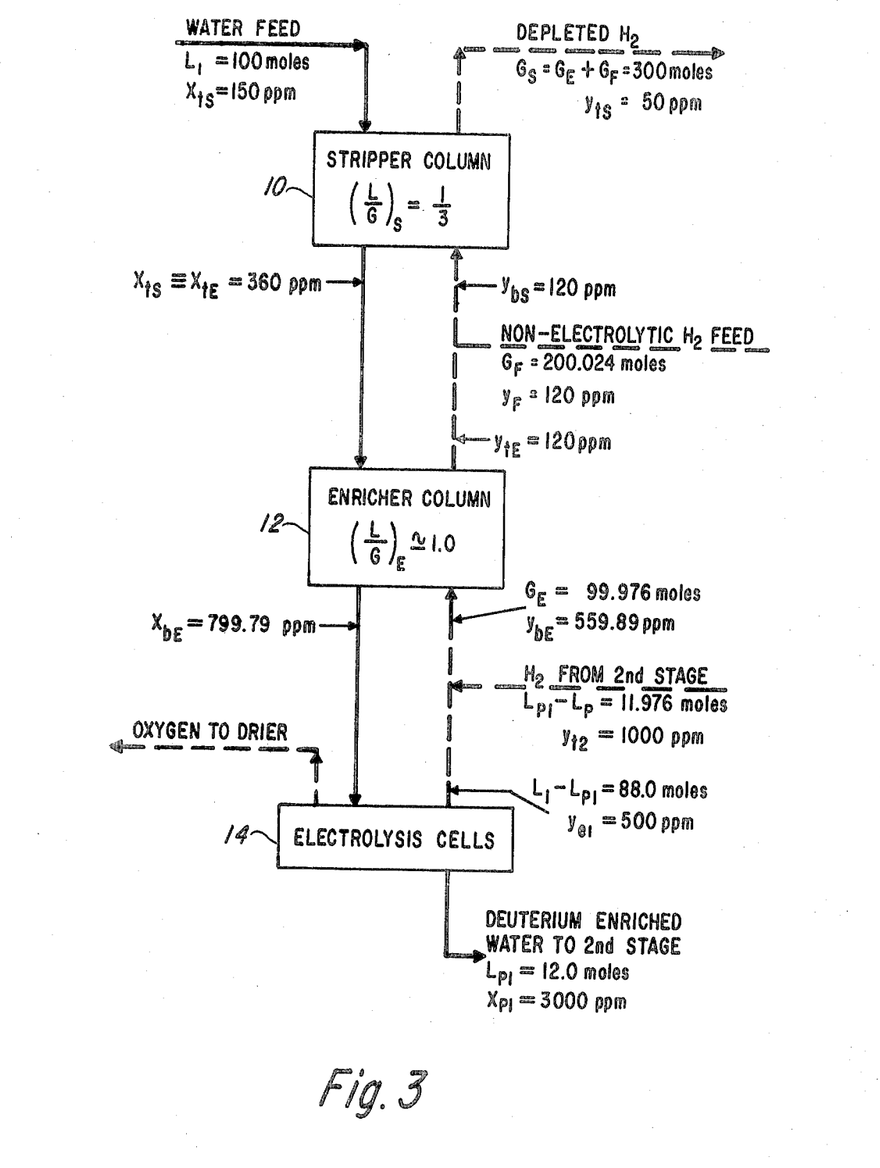
FIG. 3 provides a numerical example of the system which is represented schematically in FIG. 2.

A numerical example of the first stage of this modified CECE-HWP is presented in FIG. 3 for $Z\alpha=3.0$ and $\alpha_e=6.0$.

Figure 4:
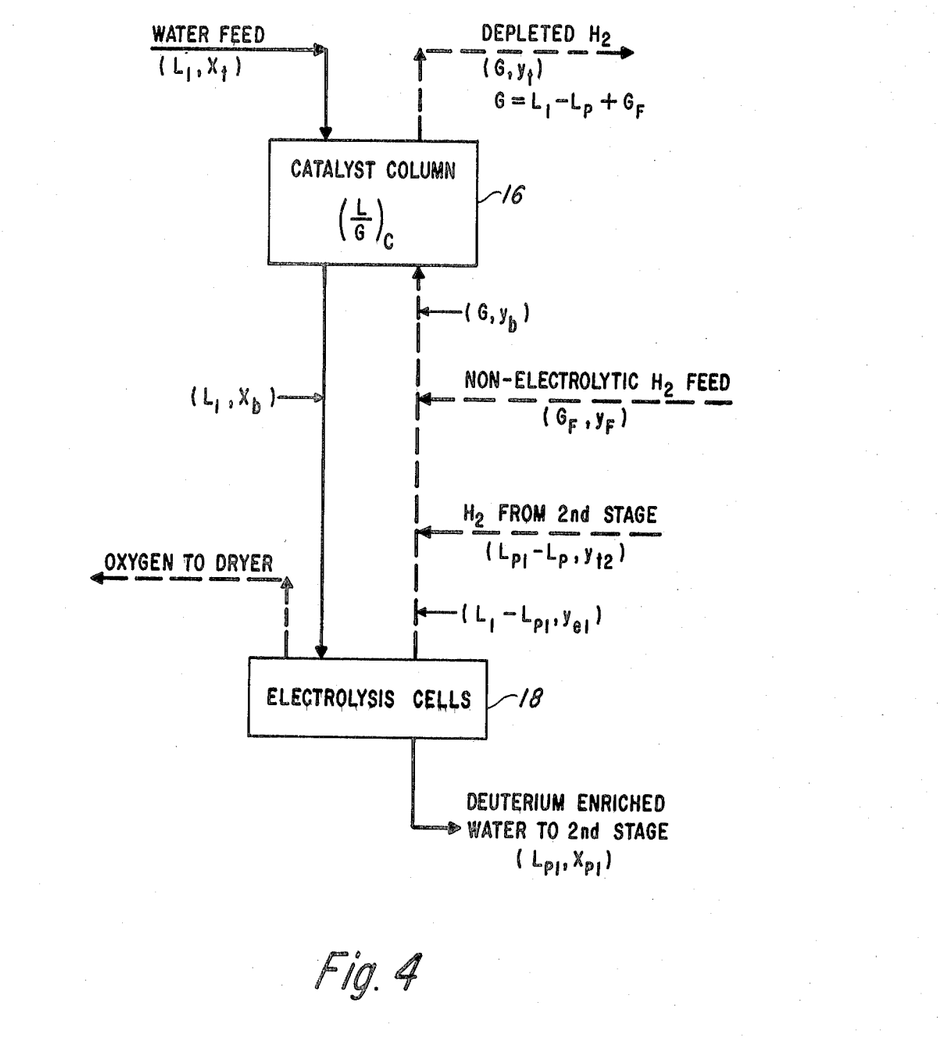
FIG. 4 is a schematic representation of the first stage of a second embodiment of the system for stripping deuterium from a non-electrolytic hydrogen stream, using the combined electrolysis and catalytic exchange process.

3.2 Non-Electrolytic Hydrogen Admixture With Hydrogen Gas From Electrolyser Cells, at the Bottom of a Single Catalyst Column A second arrangement for the modified CECE-HWP which uses a source of non-electrolytic hydrogen as a partial feed to the first stage of the plant is pictured schematically in FIG. 4. $L_1$ moles of feed water with a deuterium atom fraction of $X_t$ enter the system at the top of the single catalyst column 16, and pass countercurrent to a stream of hydrogen gas. The hydrogen gas which enters at the bottom of the column consists of a mixture of $G_F$ moles of non-electrolytic hydrogen with a deuterium concentration $y_F$, $(L_1-L_{p1})$ moles of hydrogen from the electrolysis cells having a deuterium concentration $y_{e1}$, and $(L_{p1}-L_p)$ moles of hydrogen which are a reflux stream from the second stage catalyst column. As in the preferred embodiment, the total hydrogen flow in the catalyst column, $G=L_1-L_p+G_F$, is depleted in deuterium and leaves the top of the column at a deuterium concentration of $y_t$. The $L_1$ moles of water flowing through the stripper are enriched in deuterium and the resulting water stream enters electrolysis cells 18 at a deuterium concentration of $X_b$. As with the preferred embodiment, the amount of non-electrolytic hydrogen which may be admixed at the bottom of the catalyst column may be varied between 0 and some maximum amount. This maximum is derived by assuming that the fractional approach to equilibrium between the two phases at the top and bottom of the column is the same, that is, the value of Z at these two positions is the same.

Using the notation of FIG. 4, the deuterium concentration in the liquid and gas phases at the base of the catalyst column may be calculated from the material balance conditions for the electrolyser and the catalyst column respectively, as follows:

$$X_b = y_{e1} + (X_{p1} - y_{e1})L_{p1}/L_1 \text{ and} \tag{27}$$

$$y_b = (L/G)X_b + y_t - (L/G)X_t. \tag{28}$$

Since it is assumed that the deuterium concentrations are pinched to the value Z at the base and top of the column, these concentrations are related by the expressions $$X_b/y_b = Z\alpha \text{ and } X_t/y_t = Z\alpha. \tag{29}$$

Substituting these equations into (28), solution for the liquid to gas ratio in the catalyst column yields the result:

$$(L/G) = 1/Z\alpha. \tag{30}$$

Substitution of $G=L_1-L_p+G_F$, the maximum flow of non-electrolytic hydrogen which may be admixed with electrolytic hydrogen at the base of the catalyst column may be calculated:

$$G_F = L_1(Z\alpha - 1) + L_p. \tag{31}$$

This result is identical to equation (16), and it demonstrates that the method of this invention may be practised with the non-electrolytic hydrogen being admixed either at the base of a single catalyst column, or with the electrolytic hydrogen stream between an enricher column and a stripper column.

In the second embodiment of the invention, definition of the liquid and gas streams is completed by recording the flow of deuterium enriched water to the second stage:

$$L_{p1} = \frac{L_1 X_t + G_F y_F - L_p y_{t2} - (L_1 - L_p + G_F) y_t}{X_{p1} - y_{t2}}. \tag{32}$$

With this result the concentrations in the liquid and gas phases at the base of the catalyst column may be calculated respectively from equations (27) and (28).

Figure 5:
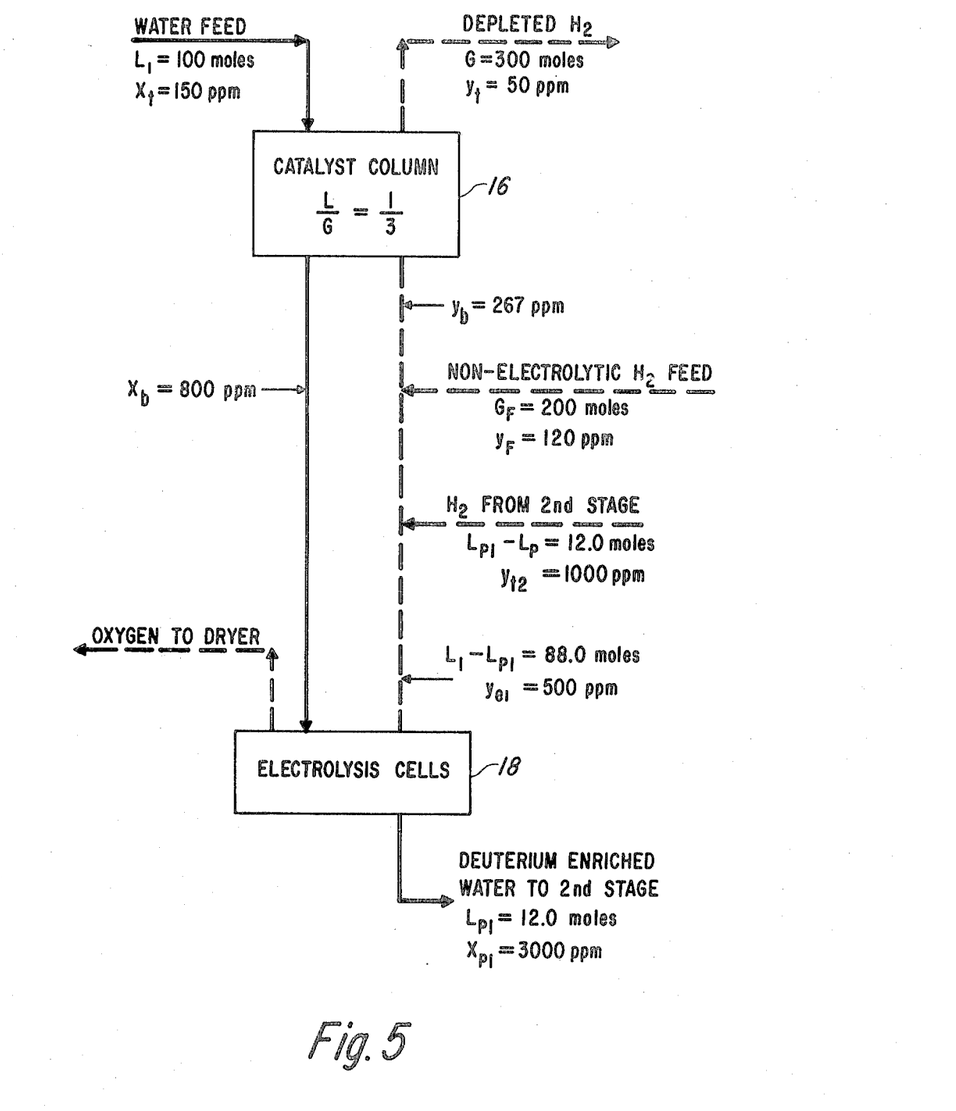
FIG. 5 provides a numerical example of the system which is illustrated schematically in FIG. 4.

A numerical example of the first stage of this alternate embodiment is presented in FIG. 5 for $Z\alpha = 3.0$ and $\alpha_e = 6.0$.

4. Production of Heavy Water

Figure 6:
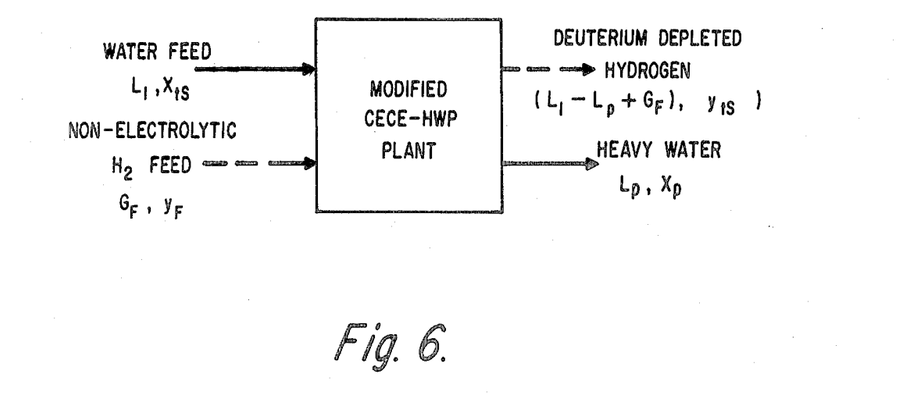
FIG. 6 is a schematic representation showing the deuterium material balance for a plant producing heavy water using non-electrolytic hydrogen and natural water as feed streams.

The net production of heavy water can be determined from a deuterium material balance for the whole plant. Referring to FIG. 6, it can be shown that the final product flow, $L_p$, is given by the expression:

$$L_p = \frac{L_1(X_{ts} - y_{ts}) + G_F(y_F - y_{ts})}{X_p - y_{ts}}. \tag{33}$$

In the preferred embodiment of the invention this result is usefully written as:

$$L_p = \frac{L_1\left[(X_{ts} - y_{ts}) + \left(\frac{1}{-(L/G)_S} - \frac{1}{(L/G)_E}\right)(y_F - y_{ts})\right]}{X_p - y_{ts}}. \tag{34}$$

From equation (34) and the deuterium atom fractions in the various process streams, $L_p$ and $(L/G)_E$ can be evaluated for any desired value of $(L/G)_S$ in the possible range, $\sim 1/\alpha$ to $\sim 1$, as discussed previously. Since $(L/G)_E$ in the first stage of the process is essentially unity, and $y_{tS}$ is very small compared to typical product concentrations, for example $X_p \simeq 0.998$, equation (34) becomes:

$$L_p = \frac{L_1\left[(X_{ts} - y_{ts}) + \left(\frac{1}{(L/G)_S} - 1\right)(y_F - y_{ts})\right]}{X_p}. \tag{35}$$

The final product flow given in equation (34) may also be expressed in terms of the electrolytic hydrogen flow as:

$$L_p = \tag{36}$$

$$\frac{G_E(L/G)_E}{X_p - y_{ts}}\left[(X_{tS} - y_{tS}) + \left(\frac{1}{(L/G)_S} - \frac{1}{(L/G)_E}\right)(y_F - y_{tS})\right]$$

$$\simeq \frac{G_E}{X_p}\left[(X_{tS} - y_{tS}) + \left(\frac{1}{(L/G)_S} - 1\right)(y_F - y_{tS})\right]$$

An equivalent expression may be derived from equation (33) for the second embodiment of the invention.

Assuming that the top of the stripper column (in the preferred embodiment) or the single catalyst column (in the second embodiment) is operated such that the ratio of the deuterium concentrations in the liquid and gaseous phases is pinched to the value Z, and also that the deuterium concentration in the product stream $X_p$ is very large with respect to that in the product hydrogen stream $y_{tS}$, the heavy-water production may be written from equation (33) as:

$$L_p X_p \simeq L_1\left[X_{tS}(1 - \frac{1}{Z\alpha}) + (\frac{G_F}{L_1})(y_F - \frac{X_{tS}}{Z\alpha})\right]. \tag{37}$$

If the maximum quantity of non-electrolytic hydrogen is being admixed and equations (16) and (31) describe the non-electrolytic hydrogen flow, the rate of heavy-water production simplifies to:

$$L_p X_p \simeq L_1 y_F(Z\alpha - 1)$$

where it has been assumed that the product flow $L_p$ is small with respect to the feed water flow $L_1$. When this maximum amount of non-electrolytic hydrogen is being admixed, the efficiency of heavy-water recovery expressed in terms of the deuterium content of the feed water to the first catalyst column is:

Efficiency of heavy water production = $(Z\alpha - 1)y_F/X_{tS}$.   (39)

Calculated values of this efficiency will always exceed 100%. They only have meaning when considered from the point of view of the electrolyser component of the total recovery system.

At 0° C. and 1 atmosphere pressure, one mole of an ideal gas occupies 22.414 liters. More exact measurements for hydrogen at the same temperature and pressure give its molar volume as $$\bar{V}_{0° C.} = 22.43 \text{ liter/mole.}$$

Transforming this result to "standard conditions", 20° C. and 1 atmosphere, $$\bar{V}_{20° C.} = 22.4^3 \times \frac{293.2}{273.2}$$
$$= 24.07 \text{ liter/mole.}$$

Using this value, the volume of hydrogen produced by 1000 amperes for one hour is $$\frac{1000 \times 3600}{2 \times 96487} \times 24.07 = 449 \text{ standard liters}$$
or $449 \times 10^{-3} = 0.449$ standard cu. m.
or $449 \times \frac{1000}{(12 \times 2.54)^3} = 15.86$ standard cu. ft. (SCF)

On the other hand, one thousand amperes current for one hour consume $$\frac{1000 \times 3600}{2 \times 96487} = 18.66 \text{ moles}$$

of water. If this feed water contains deuterium at a concentration $X_{tS}$, the corresponding heavy-water production will be $18.66 \times 20.03 \times 10^{-3} \times X_{tS} x \eta = 0.374 X_{tS} \eta$ Kg, where $\eta$ is the recovery efficiency.

Thus the weight of heavy-water produced per SCF of hydrogen evolved is $$\frac{0.374 X_{tS} \eta}{15.86} = 0.0236 X_{tS} \eta \text{ Kg.}$$

If the efficiency of heavy-water recovery is $(Z\alpha-1)y_F/X_{tS}$ as derived in equation (39) above then the heavy-water production per 1000 SCF of electrolytic hydrogen is:

23.6$(Z\alpha-1)y_F$ Kg.   (40)

As an example let us consider a 1000 TPD ammonia plant utilizing $7.6 \times 10^7$ SCF hydrogen per day which contain 120 ppm of deuterium. According to this invention, a fraction $1/Z\alpha$ of the required feed stock of $7.6 \times 10^7$ SCF per day will be produced electrolytically, with the balance being obtained by hydrocarbon reformation or a similar process. Two possible values of the product $Z\alpha$ are considered, 3.0 and 3.6. These are realistic values for a catalyst column operating at 60° C. and 25° C. respectively. The results are tabulated in Table I:

TABLE I

| Parameter | Value $Z\alpha = 3$ | Value $Z\alpha = 3.6$ |
|---|---|---|
| Total electrolytic hydrogen requirement (SCF/day) | $2.5 \times 10^7$ | $2.1 \times 10^7$ |
| Annual heavy-water production (metric tons) | 51.5 | 56.2 |
| Annual heavy-water product value ($214 US/kg) | $11,020,000 | $12,030,000 |

The required electrolytic plant capacity is 25 million SCF of hydrogen per day for $Z\alpha = 3.0$, while it is 21 million SCF for $Z\alpha = 3.6$. The annual heavy-water production is 51.5 metric tons for $Z\alpha = 3.6$ and 56.2 metric tons for $Z\alpha = 3.6$ as calculated from equation (40). For the published 1977 heavy-water price of $214 US per kg (Nucleonics Week, Volume 18, No. 12, p. 11, Mar. 24, 1977), the annual value of heavy-water recovery is $11,020,000 for $Z\alpha = 3.0$ and $12,030,000 for $Z\alpha = 3.6$, which is substantial.

EXAMPLE OF THE INVENTION

The method of this invention has been demonstrated in an apparatus of the type demonstrated schematically in FIG. 4. The electrolyser used was a 2-cell electrolysis unit manufactured by the General Electric Company. It was of the solid polymer electrolyte type containing only pure water as the liquid phase. The unit was operated at a total current of 20 A so that the electrolytic hydrogen production corresponded to 40 cell amperes. The non-electrolytic hydrogen which was admixed with the electrolytic hydrogen at the base of the catalyst column (FIG. 4) was prepurified by a Ag/Pd diffuser. Hydrogen flows were measured with a soap-bubble flow meter. All hydrogen/deuterium analyses for the hydrogen streams were performed on a 2-collector magnetic-sector mass spectrometer system, as were hydrogen/deuterium analyses for water up to about $300 \times 10^{-6}$ D/(H+D). At higher deuterium concentrations, the hydrogen/deuterium analyses for water samples were performed using an infra-red double beam spectrometer. The catalyst column was 2.54 cm in diameter by 80 cm long. It was filled with 40 cm of 0.6-cm diameter alumina spheres, and 36 cm of a 50/50 mixture of inert alumina spheres and platinum-carbon-Teflon coated alumina spheres similar to those disclosed in U.S. Application Ser. No. 733,417. The catalyst contained 0.253 weight percent of platinum. The entire column was thermostated at 24° C. with a circulating constant-temperature water bath.

Figure 7:
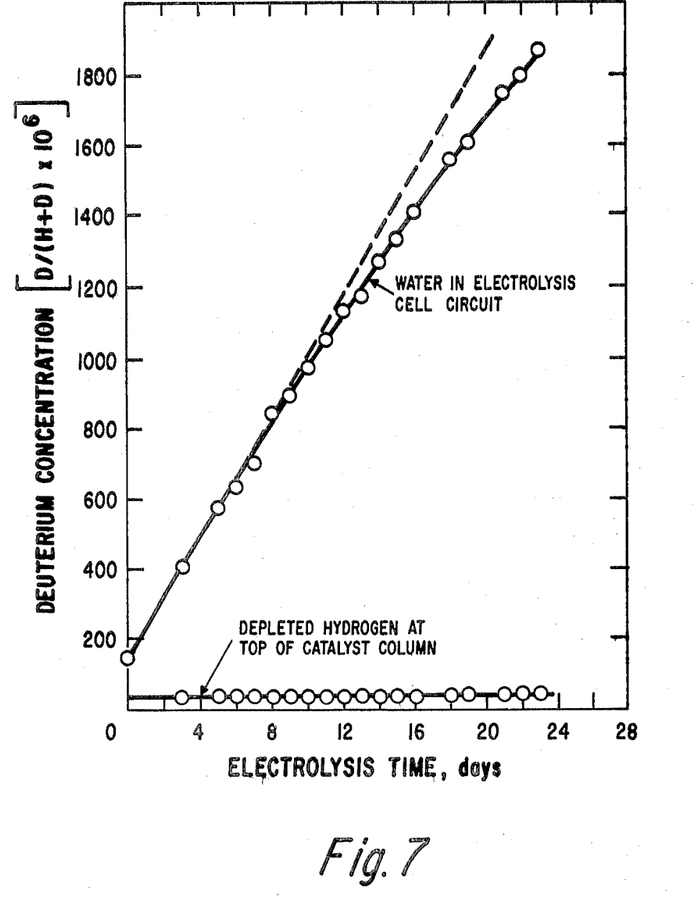
FIG. 7 shows the concentration of deuterium in an electrolysis cell water circuit and in the depleted hydrogen gas at the top of the catalyst column as a function of electrolysis time with no admixture of non-electrolytic hydrogen.

FIG. 7 illustrates the performance of this system with no admixture of non-electrolytic hydrogen. In terms of the parameters defined in FIG. 4, the hydrogen gas leaving the top of the catalyst column had a deuterium composition of approximately $y_t = 50$ ppm, and this remained essentially constant over a period of 21 days. The concentration of deuterium in the electrolyte, $X_{p1}$, rose steadily from its natural abundance of 144 ppm to more than 1800 ppm after 21 days. If there were no deuterium losses from the system, this increase would be expected to be linear. Some losses do occur, however, with water entrained with the product oxygen gas, and the measured concentrations deviate somewhat from the assymptotic broken straight line of FIG. 7.

Figure 8:
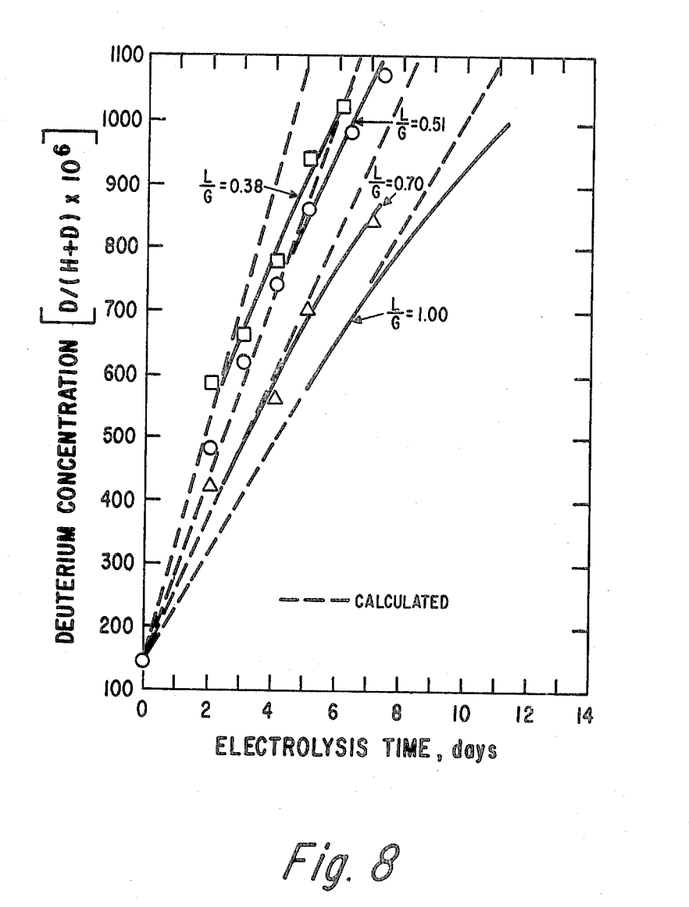
FIG. 8 shows the deuterium concentration in the electrolysis cell water circuit as a function of electrolysis time with various admixtures of non-electrolytic hydrogen.

FIG. 8 represents a demonstration of the present invention which was carried out on the same apparatus. The curve labelled L/G=1.00 is the data of FIG. 7 with its broken straight line. The corresponding curves labelled L/G=0.70, 0.51, and 0.38 represent results obtained with various admixtures of non-electrolytic hydrogen gas at the base of the catalyst column. The corresponding ratios of non-electrolytic gas to electrolytic gas are respectively 0.43, 0.96, and 1.65. The broken straight lines associated with each set of data are calculated from the electrolyte volume of 400 ml, making use of the fact that the hydrogen leaving the top of the catalyst column contains deuterium at 50 ppm.

It is clear from FIG. 8 that admixture of non-electrolytic hydrogen gas has resulted in a substantial increase in the rate of deuterium accumulation in the electrolyte. This increased rate of accumulation further increases with increased admixture of non-electrolytic hydrogen. For example, admixture of a non-electrolytic hydrogen stream 1.6 times greater than the electrolytic stream has resulted in a 120 percent increase in the rate of deuterium accumulation in the electrolyte.

The embodiments of the invention in which an exclusive property or privilege is claimed are defined as follows:

1. A method for heavy-water extraction from non-electrolytic hydrogen streams using a combined electrolysis and catalytic exchange heavy-water process, comprising:
   (a) contacting feed water in a catalyst column with hydrogen gas originating partly from said non-electrolytic hydrogen stream and partly from an electrolyte hydrogen stream so as to enrich the feed water with deuterium present in the hydrogen gas; and
   (b) passing the enriched feed water to an electrolyser wherein the electrolytic hydrogen gas is generated and then fed through the catalyst column.

2. A method as defined in claim 1, wherein the feed water is contacted with two catalyst columns namely a stripper column and an enricher column connected in series, wherein the feed water is fed to the top of the stripper column, the deuterium enriched water leaving the bottom of the stripper column fed to the top of the enricher column and the deuterium enriched water leaving the bottom of the enricher column fed to the electrolyser, wherein the electrolytic hydrogen gas originating from the electrolyser is fed to the bottom of the enricher column and the hydrogen gas leaving the top of the enricher column is mixed with the non-electrolytic hydrogen gas and fed to the bottom of the stripper column.

3. A method as defined in claim 2, wherein the heavy water extraction is done in a series of stages with the non-electrolytic hydrogen stream being fed to the first stage only and wherein the first stage only has two catalyst columns.

4. A method as defined in claim 3, wherein, for the second and successive stages, the feed water for that stage is withdrawn from the electrolyser of a previous stage in the series, whereas the hydrogen gas generated in the second stage, after passing through the catalyst column of that stage, is returned to the first stage where it is mixed with the electrolytic hydrogen gas and the resulting gas mixture fed to the bottom of the enricher, of the first stage, and whereas the hydrogen gas generated in the third and successive stages, after passing through the catalyst column of that stage, is returned to the previous stage where it is mixed with the electrolytic hydrogen gas and the resulting gas mixture fed to the catalyst column of said previous stage.

5. A method as defined in claim 1, wherein the feed water is fed to the top of the catalyst column and the deuterium enriched water leaving the bottom of the catalyst column is fed to the electrolyser, and whereas the electrolytic hydrogen originating from the electrolyser is mixed with the non-electrolytic hydrogen gas and fed to the bottom of the catalyst column.

6. A method as defined in claim 5, wherein the heavy-water extraction is done in a series of stages with the non-electrolytic hydrogen stream being fed to the first stage only, and wherein for the second and successive stages, the feed water for that stage is withdrawn from the electrolyser of a previous stage in the series, whereas the hydrogen gas generated in each stage after passing through the catalyst column of that stage, is returned to the previous stage where it is mixed with the electrolytic hydrogen gas and the resulting gas mixture fed to the bottom of the catalyst column of said previous stage.

7. A method as defined in claim 1, wherein the ratio of non-electrolytic hydrogen gas to electrolytic hydrogen gas is up to approximately $\alpha-1$, where $\alpha$ is the eqilibrium deuterium to hydrogen ratio between liquid water and hydrogen gas in the catalyst column.

* * * * *